Patented July 25, 1933

1,919,889

UNITED STATES PATENT OFFICE

ALPHONS O. JAEGER, OF MOUNT LEBANON, AND LLOYD C. DANIELS AND HERBERT J. WEST, OF CRAFTON, PENNSYLVANIA, ASSIGNORS TO THE SELDEN COMPANY, OF PITTSBURGH, PENNSYLVANIA, A CORPORATION OF DELAWARE

MANUFACTURE OF IMIDES OF DICARBOXYLIC ACIDS

No Drawing.   Application filed December 31, 1929. Serial No. 417,817.

This invention relates to the manufacture of imides of dicarboxylic acids and particularly dicarboxylic acids having the acid groups in the peri position. Examples of such acids are napthalic anhydride or acid, its homologues and substituted derivatives, peri dicarboxylic acids of anthracene, such as, for example, anthracene 1,9-dicarboxylic acid or its homologues or substituted derivatives and the like.

In the past imides of some of these dicarboxylic acids, for example napthalimide, have been prepared under anhydrous conditions, either by heating the dry ammonium salt or by passing ammonia into or over the heated anhydride. Where the ammonium salt is heated it must either be subjected to an expensive and complicated preliminary purification or an impure imide results, especially when use is made of unpurified or technical grades of anhydrides prepared by catalytic methods. When ammonia is passed over the heated anhydride all the impurities in the anhydride are retained in the imide and only a part of the ammonia is effectively utilized in the reaction. In both cases if purification is effected, and practically all purification methods require working in solution, it is necessary to dry the raw material, adding to the cost and to the time required.

It has also been proposed to heat naphthalic anhydride or naphthalic acid with aqueous ammonia on a water bath. This process gives good yields of naphthalimide on a small scale.

According to the present invention, which is a particularly advantageous method when dealing with dicarboxylic acids or their anhydrides containing alkali insoluble impurities, the process consists in forming the alkali metal salt of the acid and causing it to react in aqueous solution with an ammonium salt. The procedure utilizes very cheap raw materials and it is possible to subject the alkali metal salt of the acid to various purification processes. Thus, for example, the alkali metal salt solution may be filtered from alkali insoluble impurities or it may be subjected to various purification treatments such as, for example, treatments with hypohalites or other oxidizing agents, activated carbon or other adsorptives, etc., followed by filtration. An extremely attractive process is thus possible which includes cheap purification methods, permitting the utilization of relatively crude raw material and resulting in the production of imides of high purity.

Instead of using ammonium salts, the salts of the corresponding primary amines may be used, such as, for example, salts of primary alkyl amines, for instance methyl, ethyl, propyl, butyl, etc., cyclic amines such as analine, benzylamine, cyclohexylamine, and the like. The corresponding substituted imides are obtained.

This invention will be described in greater detail in connection with the following specific examples:

Example 1

A solution of sodium naphthalate is obtained by dissolving the catalytic oxidation product of acenaphthene in an amount of sodium carbonate 10% in excess of that required to neutralize all of the acid, filtered, and then treated with ammonium sulfate, chloride, nitrate or other soluble ammonium salt in an amount about 25% in excess of that required for imidization of the solution of the naphthalic acid salt. The solution is heated to 70–95° C. for about 16 hours and the yields of imide obtained are quantitative.

The imide produced above is free from alkali insoluble impurities but may possess color, depending on the purity of the naphthalic anhydride used. The color can be removed and a chemically pure naphthalimide obtained by treating the sodium salt with a hypohalite or other alkaline oxidizing agent before or after filtering, or the filtrate may be decolorized by activated carbon or other suitable absorbents. The treatment with the ammonium salt is the same, and quantitative yields of chemically pure naphthalimide are obtained, provided, of course, that the ammonium salt used is itself pure. The product usually has a sharp melting point of over 300° C., in most cases about 301° C. Similar quantitative results are obtained with homologues of naphthalic anhydride and derivatives such as halogen, nitro and other substituted naphthalic acids.

Instead of using an ammonium salt, salts of other amines may be used, for example aniline hydrochloride, methylamine hydrochloride, ethylamine hydrochloride, or cyclohexylamine hydrochloride may be used, giving excellent yields of the corresponding substituted imides.

*Example 2*

A solution of the sodium salt of anthracene 1,9-dicarboxylic acid is prepared by dissolving the acid in a sodium carbonate solution, using preferably an excess of sodium carbonate amounting to about 10–15% of that required to neutralize all the acid. The solution is filtered free from alkali insoluble material and, if desired, may be treated with an alkaline oxidizing agent such as a hypohalite, either before or after filtering, or, if desired, the filtrate may be decolorized by the use of activated carbon. The solution of the sodium salt of anthracene 1,9-dicarboxylic acid is treated with a soluble ammonium or alkyl amine salt, using the salt in 20–30% excess for that required for the imidization of the acid. The solution is heated to 70–100° C. for 12 to 20 hours. The imide formed separates out in good yields, and if the acid salt has been purified prior to imidization a very high purity of product is obtained.

Similarly the phenyl or tolyl imide may be obtained by using aniline or toluidine hydrochloride instead of the ammonium or alkyl amine salt.

The specific examples have given certain temperatures and proportions of ingredients which prove desirable in certain modifications of the invention. It should be understood, however, that the invention is in no sense limited thereto. Thus, for example, it is not necessary to use the particular amounts of alkali and ammonium salt in excess of the theoretical. An excess is desirable to obtain a quantitative yield, but it does not have to be exactly 10 and 25% respectively, larger excesses giving the same quantitative yields and smaller excesses affecting the yield but little. It is desirable to carry on the imidization step for a sufficient period of time to obtain the maximum conversion. Under the conditions given in Example 1, 16 hours will ordinarily be sufficient but under other conditions longer or shorter times should be used. In general the heating time for this step should be continued until the imidization has proceeded to completion or to the maximum equilibrium obtained under the particular conditions.

What is claimed as new is:

1. A method of producing imides from peri dicarboxylic acids, which comprises subjecting a water dispersion of an alkali metal salt of the dicarboxylic acid to reaction with a salt of a base of the group consisting of ammonia, primary amines.

2. A method of producing a naphthalimide from the corresponding naphthalic acid, which comprises subjecting a water dispersion of an alkali metal salt of the naphthalic acid to reaction with a salt of a base of the group consisting of ammonia, primary amines.

3. A method according to claim 1, in which the reaction takes place at a temperature below the boiling point of the mixture at atmospheric pressure.

4. A method according to claim 2, in which the reaction takes place at a temperature below the boiling point of the mixture at atmospheric pressure.

5. A method of producing imides from peri dicarboxylic acids, which comprises dissolving up the acid in an alkali, filtering from alkali insoluble impurities, and subjecting a water dispersion of the alkali metal salt to reaction with a salt of a base of the group consisting of ammonia, primary amines.

6. A method of producing a naphthalimide from the corresponding naphthalic acid, which comprises dissolving up the acid in an alkali, filtering from alkali insoluble impurities, and subjecting a water dispersion of the alkali metal salt to reaction with a salt of a base of the group consisting of ammonia, primary amines.

7. A method of producing imides of peri dicarboxylic acids, which comprises subjecting a water solution of an alkali metal salt of the dicarboxylic acid to the action of an alkaline oxidizing agent, filtering from insoluble impurities and causing the alkali metal salt of the dicarboxylic acid to react with a salt of a base of the group consisting of ammonia, primary amines in the presence of water.

8. A method of producing a naphthalimide from the corresponding naphthalic acid, which comprises subjecting a water solution of an alkali metal salt of the naphthalic acid to the action of an alkaline oxidizing agent, filtering from insoluble impurities and causing the alkali metal salt of the naphthalic acid to react with a salt of a base of the group consisting of ammonia, primary amines in the presence of water.

9. A method of producing imides of peri dicarboxylic acids, which comprises subjecting a water solution of an alkali metal salt of the dicarboxylic acid to the action of a hypohalite, filtering from insoluble impurities and causing the alkali metal salt of the dicarboxylic acid to react with a salt of a base of the group consisting of ammonia, primary amines in the presence of water.

10. A method of producing a naphthalimide from the corresponding naphthalic acid, which comprises subjecting a water solution of an alkali metal salt of the naphthalic acid to the action of a hypohalite, filtering from insoluble impurities and causing the alkali metal salt of the naphthalic acid to react with a salt of a base of the group consisting of ammonia, primary amines in the presence of water.

11. A method of preparing imides of peri dicarboxylic acids, which comprises dissolving up the acid in a small excess of aqueous alkali over the amount theoretically required to neutralize the acid, purifying the alkali metal salt thus obtained and causing it to react in a water dispersion with a salt of a base included in the group ammonia, primary amines in small excess over that theoretically required to replace the alkali metal in the salt of the dicarboxylic acid.

12. A method of preparing a naphthalimide from the corresponding naphthalic acid, which comprises dissolving up the acid in a small excess of aqueous alkali over the amount theoretically required to neutralize the acid, purifying the alkali metal salt thus obtained and causing it to react in a water dispersion with a salt of a base included in the group ammonia, primary amines in small excess over that theoretically required to replace the alkali metal in the salt of the naphthalic acid.

ALPHONS O. JAEGER.
LLOYD C. DANIELS.
HERBERT J. WEST.